(No Model.)

C. W. LAWRENCE.
PROCESS OF DISTILLING ALCOHOL.

No. 246,793. Patented Sept. 6, 1881.

WITNESSES:
C. Neveux
C. Sedgwick

INVENTOR:
C. W. Lawrence
BY Munn &Co
ATTORNEYS.

United States Patent Office.

CHARLES W. LAWRENCE, OF NEW YORK, N. Y.

PROCESS OF DISTILLING ALCOHOL.

SPECIFICATION forming part of Letters Patent No. 246,793, dated September 6, 1881.

Application filed April 14, 1881. (No specimens.)

*To all whom it may concern:*

Be it known that I, CHARLES W. LAWRENCE, of the city, county, and State of New York, have invented a new and Improved Process of Distilling Alcohol, of which the following is a specification.

The principal object of my invention is the production of refined French or odorless spirit direct from the still.

Figure 1:
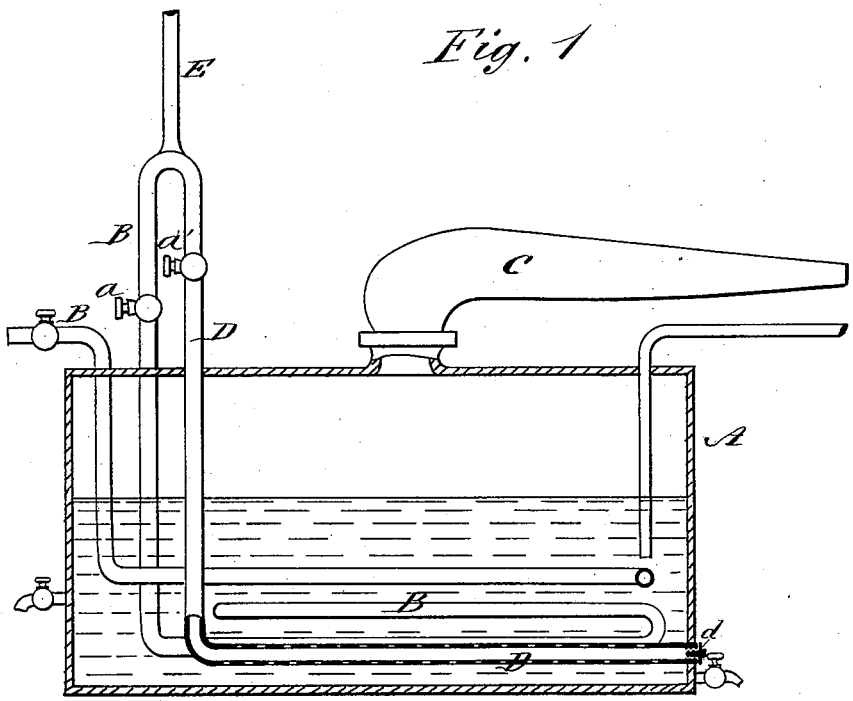
Figure 2:
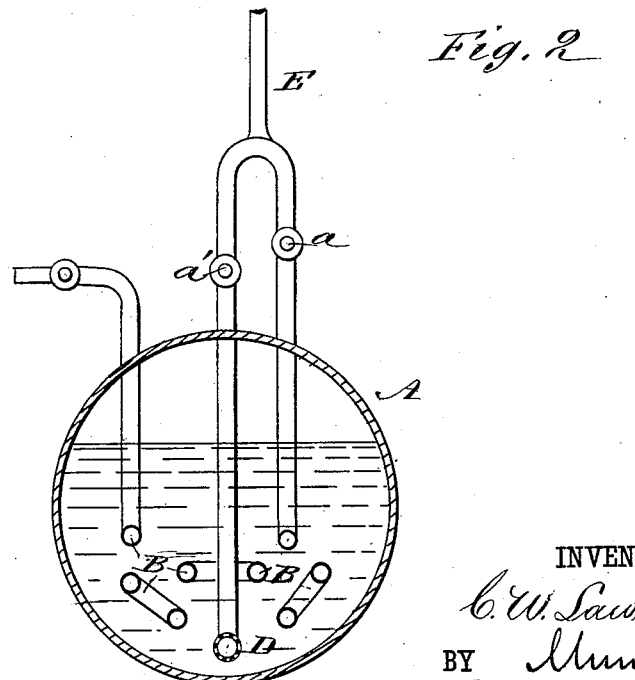

In the accompanying drawings, Figure 1 is a vertical longitudinal section, showing the construction of the still I prefer to use; and Fig. 2 is a cross-section of the same.

Similar letters of reference indicate corresponding parts.

A represents the still-body, which is provided with the ordinary goose-neck, C, which leads to the column which is not shown. The interior of the still is provided with the heating-pipe B and the perforated branch pipe D, which may be united with each other outside of the still, as shown, and both pipes supplied with steam from the steam-pipe E. The pipes B and D are provided with the cocks $a\ a'$, by which the steam may be admitted or cut off from either in the still at pleasure, and the end $d$ of the pipe D opens outside of the head of the still, and is closed with a screw cap or plug, which may be easily removed for clearing out the still.

In using this still in carrying out my process I first charge it with the requisite quantity of whisky or other spirit-yielding material, and then charge the still with a quantity of charcoal. I employ about one bushel of coal to every forty or fifty gallons of whisky, although a smaller or a larger proportion of coal may be used without departing from the principle of my invention. Steam is then let through the perforated pipe by turning the cock $a'$, and the flow continued until the charcoal and spirit-yielding material are thoroughly agitated and mixed together. The cock $a'$ is now to be closed and the cock $a$ opened, and the steam admitted through the heating-pipe B, and the distillation continued in the usual way, the ebullition of the contents of the still serving to maintain a thorough agitation and mixture of the charcoal with the whisky or spirit-yielding material, which is the main feature of my discovery.

The behavior of the charcoal in the still is such that the deleterious substances in the spirit-yielding material which would otherwise come over and corrupt the spirit are rendered less volatile, or are absorbed by the charcoal and protected by it from the action of the heat in such a manner as to hold the same to a higher distilling-point than that of the pure alcohol, and thus the refined alcohol will be separated from the deleterious substances and a French or ordorless spirit obtained.

I am aware that the use of powdered charcoal in the process of rectifying is not new, and that its use in connection with the operation of distilling as a supplemental process is not broadly new.

What I claim, and desire to secure by Letters Patent, is—

A process for obtaining refined and odorless spirit direct from the still, said process consisting in charging the still with spirit-producing material and powdered charcoal in about the proportions set forth, then stirring and heating the mass by means of steam, as shown, whereby the operations of distilling and rectifying are accomplished at one operation, the empyreumatic oil being retained by the charcoal in the still, as shown and described.

CHAS. W. LAWRENCE.

Witnesses:
C. SEDGWICK,
H. A. WEST.